Nov. 23, 1948. A. M. BUEHLER 2,454,304
FEEDING MECHANISM FOR AGRICULTURAL MACHINES
Filed May 5, 1945 2 Sheets-Sheet 2

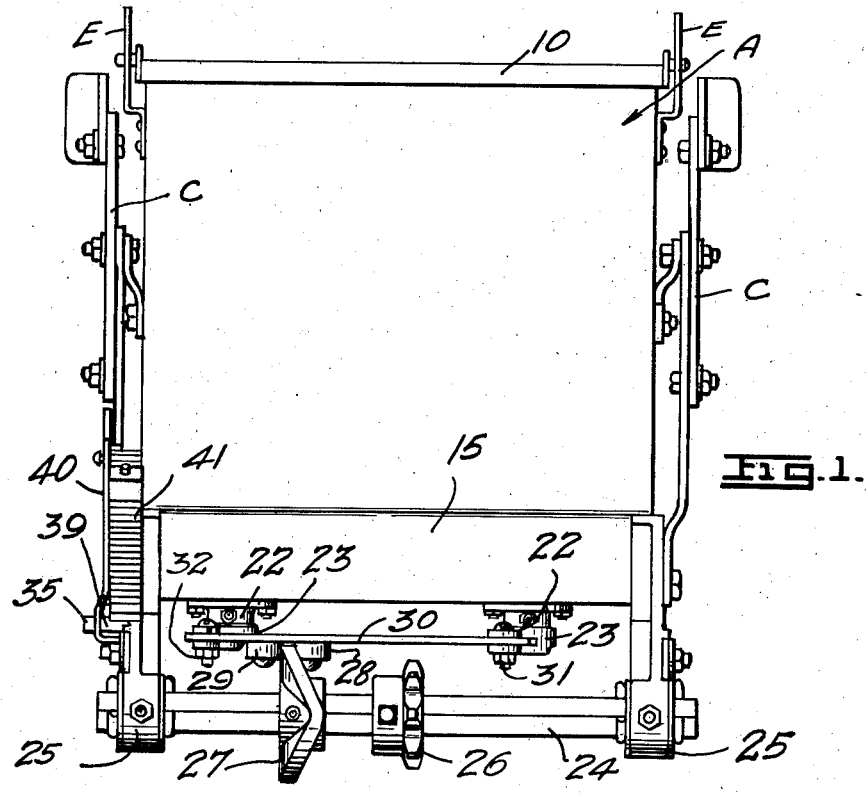
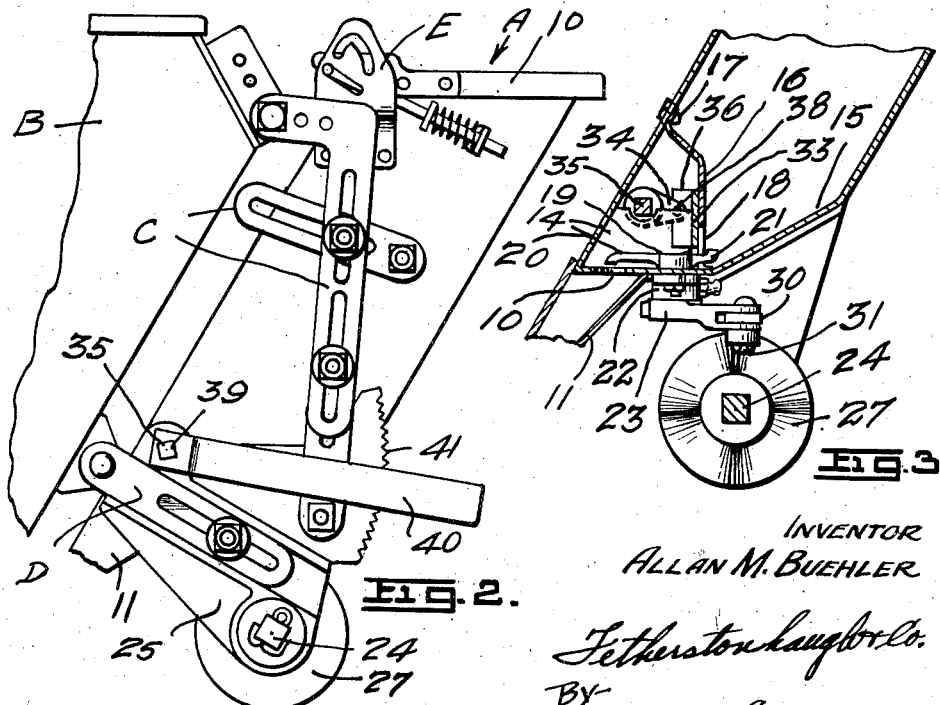

INVENTOR,
ALLAN M. BUEHLER,
Fetherstonhaugh & Co.
BY
ATTORNEYS.

Patented Nov. 23, 1948

2,454,304

UNITED STATES PATENT OFFICE 2,454,304

FEEDING MECHANISM FOR AGRICULTURAL MACHINES

Allan Moyer Buehler, Preston, Ontario, Canada, assignor to Eastern Steel Products Limited, Preston, Ontario, Canada, a company of Canada Application May 5, 1945, Serial No. 592,253

3 Claims. (Cl. 222—267)

This invention relates to feeding mechanism for agricultural machines and particularly an auxiliary feeding attachment for seed hoppers which may be used for sowing fertilizer or other granular material including seeds.

It is usual to apply a fertilizer attachment to the front or to the back of the seed hopper depending upon the type of hopper which may be employed and the mechanism which carries it. The main reason for this is that in a tractor drawn implement the operator sits in front of the implement and therefore the seeding mechanism should be mounted in the front of the hopper so that the driver may have a view of the feed in order to assure proper operation of the device. Conversely, in a horse drawn implement, the driver being located behind requires to have the feeding mechanism in front of him. This presents a problem, both from the manufacturing and user's point of view, because in making fertilizer attachments and the like, it is necessary for the manufacturer to know whether the attachment is to be used with a hopper employing a seeding mechanism disposed in front or in the rear, and it is necessary to vary the construction of the fertilizer attachment accordingly so that its feeding mechanism will rotate in the proper direction. In the case of a front feed, for instance, different gear ratios have to be employed and in some cases extra gears. It is not possible, therefore, merely to take out a gear from one type of construction in order to make it fit the place of another type of construction. The user, on the other hand, may not readily be able to obtain a hopper attachment for his particular type of machine and either must wait for delivery or devise a "makeshift" adaptation.

Further difficulties arise in respect to the sowing of the fertilizer which is usually distributed in a granular or powdered form and notwithstanding the fact that the fertilizer may seem wholly dry and granular, some of them have a tendency to gum and others will tend to cake and compact, particularly when distributed by a rotary distributor and agitator, as is usually employed.

The present invention avoids these general disadvantages while providing other advantages. It is therefore an object of the present invention to provide a feeding attachment for agricultural machines which may be used equally well on the front or the rear of the machine without requiring any mounting or driving changes.

A further object of the invention is to provide a device of this kind which will obviate gumming, caking or compacting of the fertilizer which therefore may be continuously fed in a practical manner.

A further object of the invention is to provide a device of this kind wherein the fertilizer is fed uniformly and constantly in desired regulated proportions.

A still further object of the invention is to provide a device of this kind which may be made up in predetermined units grouped so that they can be made to fit any size of machine avoiding the necessity of obtaining an attachment built especially for a given type and size of agricultural machine.

With these and other objects in view, the invention generally comprises a hopper, having at least one discharge outlet, oscillating agitating means therein and a means of actuating the agitating means including a rotary element rotatable in a clockwise or counterclockwise direction as required and subject to drive from either the front or the rear of the machine. It includes also other special features of construction.

The invention will be clearly understood by reference to the following detailed specification taken in conjunction with the accompanying drawings.

In the drawings,

Figure 1 is a front elevation of a hopper attachment for agricultural machines according to the present invention.

Figure 2 is a side elevation of Figure 1 shown mounted in conjunction with the feed hopper of a seeding machine.

Figure 3 is an enlarged fragmentary sectional detail of the bottom portion of the hopper attachment illustrating part of the feed mechanism therefor.

Figure 4:
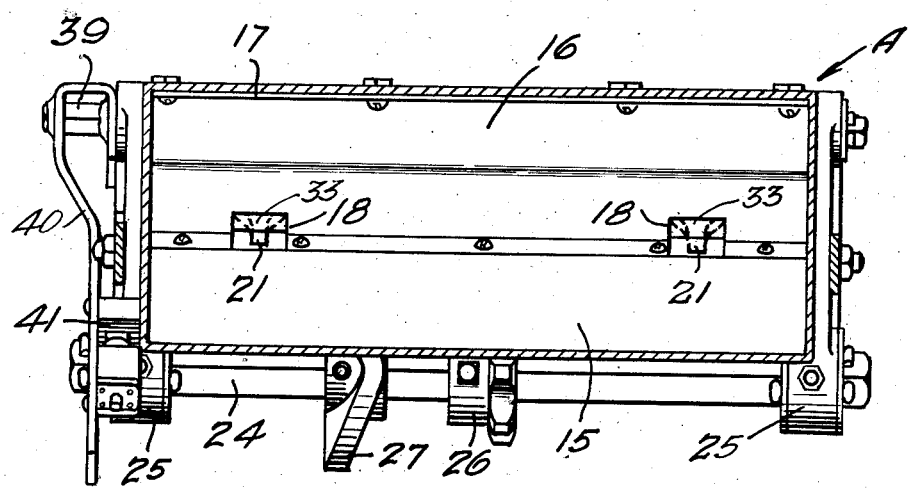
Figure 4 is a transverse section taken through a hopper of the present invention and showing the feed channels and agitating means therein.

Referring to the drawings, A indicates a hopper which in the form illustrated constitutes an auxiliary hopper designed to be connected with the seed box of an agricultural seeding machine. The hopper is connected with the seed box B by suitable suspending mechanism generally indicated by the linkage C and adjustable foot D which suspending mechanism forms part of a copending application. The hopper is closed by a suitable cover 10 and preferably includes a hinge mounting structure E which forms the subject matter of a further copending application.

Figure 5:
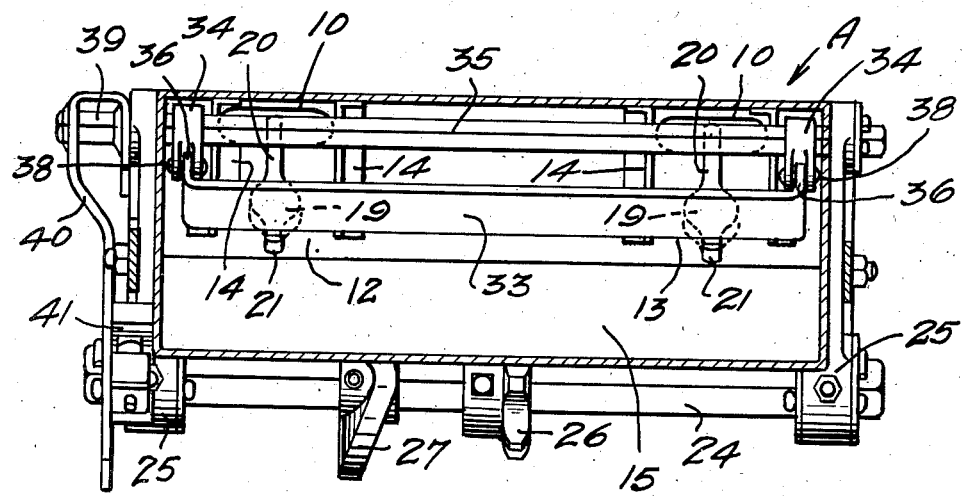
Figure 5 is a sectional view similar to Figure 4 but with the baffle removed from the interior of the hopper to illustrate the agitating means in more detail and also to illustrate the mounting and location of the feed gate as employed according to the present invention, and, Figure 6 is a transverse section taken through the feed gate to illustrate the construction of its ends.
Figure 6:
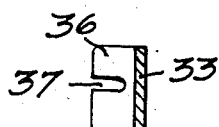

The hopper A is formed in its bottom with a plurality of discharge outlets 10 designed to communicate with discharge tubes 11 which may be introduced to the seed tubes of the seeding machine. Upon referring to Figure 5, it will be noted that restricted feed passages 12 and 13 are formed by suitable side partitions or walls 14, the passages leading to the discharge outlets 10. The forward hopper wall is preferably sloped rearwardly as at 15 to cause a flow of material contained therein normally towards the passages 12 and 13 to promote a flow therethrough to the discharge outlets 10.

A baffle or auxiliary wall 16 (Fig. 3) is disposed longitudinally of the hopper and removably fastened to the rear wall of the hopper as at 17. This baffle overlies the passages 12 and 13 substantially closes them off from the hopper except for the openings 18 formed in the baffle and which register with the passages 12 and 13 to form an entrance thereto. It is clear, therefore, that flow of material to the outlets 10 can only take place through the passages 12 and 13.

Oscillating agitators 19 are swingably connected on the bottom of the hopper within the passages 12 and 13. These agitators include a rearwardly projecting finger 20 that is disposed to overlie the discharge outlet 10 and a forwardly projecting finger 21 which passes through the entrance to the passages 12 and 13 and is preferably slightly upwardly directed towards the body of material within the hopper. The fingers 20 and 21 are disposed to project on opposite sides of the pivotal point of each agitator. The agitators are mounted on pins (not shown) which may be formed integral therewith, each pin projecting downwardly through the base of the hopper through a suitable bearing collar 22 and the lower projecting ends thereof are rigidly connected in suitable manner with a lever arm 23 in each instance.

A rotary shaft 24 is mounted on the hopper preferably by means of brackets 25 depending from opposite ends of the hopper, the said shaft including a suitable sprocket 26 and a cam member 27. The latter is designed to enter between the spaced apart rollers 28 and 29 carried on an oscillating link 30 which is pivotally connected as at 31 and 32 with the lever arms 23. Consequently, upon connecting the sprocket 26 with a suitable drive chain driven from a sprocket on the agricultural machine, the shaft 24 will be caused to rotate when the machine is driven. Likewise by reason of the cam rises the reciprocating link will be caused to reciprocate, thus oscillating the agitators 19. Of particular importance is the fact that whether hopper A is mounted forwardly of the hopper B or rearwardly of the hopper B the agitating mechanism will be operated in the same manner without it being necessary to change its design or to include extra sprockets by reason of the reversal of rotation which would normally be caused in such a case. The shaft 24, therefore, according to this construction may be rotated in a clockwise or anti-clockwise direction and will achieve exactly the same results.

Inwardly of the baffle or partition wall 16 a slidable gate 33 is mounted, preferably by means of the lifting arms 34 which are carried on an auxiliary shaft 35. The slidable gate is disposed to lie parallel to the wall 16 and to vary the size of the entrance 18 to the passages 12 and 13. The gate, as clearly shown in Fig. 5, takes the form of an elongated strap member, having inturned ends 36 which are preferably notched as at 37, and project between bifurcated portions of the lifting arms 34 to straddle a cross pin 38 which extends across the space between the bifurcated portions of these lifting arms. Consequently, the gate member 33 is readily removable.

The auxiliary shaft 35 projects as at 39 beyond an end wall of the hopper and is designed to connect with the adjusting lever 40 which operates in conjunction with suitable means such as the toothed quadrant 41 so that the lever of the gate may be readily adjusted and secured in any given position.

In operation, the material within the hopper is urged towards the entrances 18 of the passages 12 and 13 by the sloped portion 15 of the front wall of the hopper. As the agricultural machine travels forward the shaft 24 is caused to rotate either in a clockwise or counter-clockwise direction depending upon the location of hopper A. Regardless of its direction of rotation the cam 27 will cause a similar reciprocation of the link 30 which through the arms 23 will cause oscillation of the agitators 19. Consequently, the material in the hopper will pass through the entrances 18 through the passages 12 and 13 and will be constantly discharged in a steady flow and in a volume corresponding to the adjustment of the gate 33 as well as the speed of rotation of the shaft 24. In this connection, by suitably adjusting gate 33 and regulating the speed of rotation of shaft 24 a very minute adjustment of the volume of the material discharged is accomplished. Moreover, when fertilizer is being discharged any tendency towards gumming or compacting, as experienced with the usual rotary agitators, is completely avoided by the use of an oscillating agitator while at the same time this form of agitator lends itself to a means of operation as described which will function regardless as to whether the hopper A is mounted on the front or rear of the seed hopper B which, of course, varies the direction of rotation of the shaft 24.

The construction is of particularly simple character and by reason of the removable baffle 16 and the simple type of readily removable gate 33, it is clear that these parts may be easily removed to permit a thorough cleaning of the apparatus where this may be desired from time to time. Likewise, due to this simplicity, its maintenance is particularly easy.

While the hopper A has been shown as an auxiliary hopper particularly adapted to the feeding of fertilizer into the seed tubes of an agricultural seeding machine, it is obvious, of course, that the principles of construction and operation readily apply to hopper construction and in fact the hopper A may be used for the sowing of seed if desired.

A further feature of the invention resides in the fact that the hopper may be adapted to any size of agricultural machine. By way of illustration it is usual to fabricate hoppers of given sizes so that they may be suited to various types of agricultural machines. However, the present construction is readily adaptable to be produced in a number of sizes so that by providing a hopper having odd and even numbers of discharge outlets and mounting such units on a given machine the aggregate of the number of outlets in each is matched with the number of seed tubes on the machine. Thus, hoppers having five discharge outlets and six discharge outlets may be mounted on a machine having eleven seeding tubes; two six outlet hoppers may be used for a machine having twelve tubes, etc. Thus, any dealer stocking a number of these hoppers having a varying number of outlets and being informed of the number of seed tubes on any given machine merely requires to supply a combination of these hoppers to suit the given machine, and it makes no difference as to whether the hoppers are required for mounting forwardly or rearwardly.

From the foregoing it will be appreciated that I have provided a particularly simple feeding mechanism for hoppers which provides a number of advantages. It will be further appreciated that certain changes may be made under the principle of the invention and within the scope of the appended claims.

What I claim as my invention is:

1. Feeding mechanism for agricultural machines comprising a hopper including a discharge outlet adjacent the bottom thereof for discharging material therefrom, a restricted feed passage disposed in the bottom of said hopper and communicating with said discharge outlet, means in connection with said hopper for directing said material towards said feed passage, an oscillating agitator disposed in said passage in the path of said material flowing towards said outlet, said agitator being swingably mounted on a vertically disposed pin, a lever arm carried by said pin exteriorly of the hopper, a rotary shaft carried by the hopper, a cam member carried by said shaft and means operatively connecting said cam member and said lever arm to cause uniform oscillation of the agitator upon rotation of said shaft in clockwise or counter-clockwise direction.

2. Feeding mechanism for agricultural machines comprising a hopper including a plurality of discharge outlets adjacent the bottom thereof for discharging material therefrom, a plurality of restricted feed passages disposed in the bottom of the hopper and communicating with said discharge outlets respectively, a wall disposed in the bottom of the hopper substantially closing off said feed passages from the hopper, said wall including openings registering with said passages and forming entrances thereto from the hopper, means in connection with said hopper for directing said material towards said entrances, an oscillating agitator disposed in each of said passages in the path of said material flowing towards said outlets, said agitators being swingably mounted on shafts projecting to the exterior of said hopper, a lever arm carried by each of said shafts exteriorly of the hopper, a rotary operating shaft carried by the hopper, a cam member carried by said operating shaft and means operatively connecting said cam and said lever arms to cause uniform oscillating of the agitators upon rotation of said shaft in a clockwise or counter-clockwise direction.

3. Feeding mechanism for agricultural machines comprising a hopper including discharge outlets adjacent the bottom thereof for discharging material therefrom, a plurality of restricted feed passages in the bottom of said hopper extending between the interior of the hopper and the discharge outlets, a wall disposed in the bottom portion of the hopper substantially closing off said feed passages from the hopper, said wall including openings registering with said passages and forming entrances thereto from the hopper, an agitator in each of said passages pivotally mounted intermediate its ends and oscillatable in a substantially horizontal plane, a slidable gate mounted inwardly of said wall and extending longitudinally of the hopper designed to vary the size of the entrances to each of the passages, means for adjusting said gate, a rotary shaft, a cam member carried by said rotary shaft and means operatively connecting between said cam member and said agitators to cause uniform oscillation of the latter upon rotation of said shaft in a clockwise or counter-clockwise direction, the mounting of said gate including an auxiliary shaft extending longitudinally of the hopper, inwardly of said wall, said auxiliary shaft having bifurcated arms projecting therefrom substantially towards said wall and spaced apart from one another substantially the length of said auxiliary shaft, pin members extending across between the bifurcated portions of said arms, said gate having projecting elements at its ends, each formed with a slot, said projecting elements being designed to pass between the bifurcated portions of said arms, said slots straddling said pin members whereby said gate member is carried in detachable and movable relation to said arms.

ALLAN MOYER BUEHLER.

REFERENCES CITED

The following references are of record in the file of this patent:

UNITED STATES PATENTS

| Number | Name | Date |
| --- | --- | --- |
| 339,572 | Miller | Apr. 6, 1886 |
| 358,744 | Lowman | Mar. 1, 1887 |
| 479,637 | Everett | July 26, 1892 |
| 778,013 | Corser | Dec. 20, 1904 |
| 790,852 | Piza | May 23, 1905 |